(12) United States Patent
Loper, Jr.

(10) Patent No.: US 6,412,065 B1
(45) Date of Patent: Jun. 25, 2002

(54) STATUS REGISTER ASSOCIATED WITH MMX REGISTER FILE FOR TRACKING WRITES

(75) Inventor: Albert J. Loper, Jr., Cedar Park, TX (US)

(73) Assignee: IP First, L.L.C., Fremont, CA (US)

( * ) Notice: Subject to any disclaimer, the term of this patent is extended or adjusted under 35 U.S.C. 154(b) by 0 days.

(21) Appl. No.: 09/344,439

(22) Filed: Jun. 25, 1999

(51) Int. Cl.⁷ .................. G06F 9/302; G06F 9/315; G06F 13/40; G06F 15/78
(52) U.S. Cl. .................. 712/222; 712/221; 712/227; 712/245; 708/495; 710/130
(58) Field of Search .................. 712/222, 217.115, 712/220, 213, 24, 23, 22, 34, 203, 228, 21, 17, 227, 218, 229, 219, 245, 221, 223, 32, 33; 711/141, 147; 709/108, 322; 710/29, 305, 50, 62, 52, 129, 130; 708/628, 495, 551, 620, 625; 707/104.1, 103

(56) References Cited

U.S. PATENT DOCUMENTS 5,944,801 A * 8/1999 Gulick .................. 710/29
6,237,083 B1 * 5/2001 Favor .................. 712/217

* cited by examiner

Primary Examiner—Daniel H. Pan
(74) Attorney, Agent, or Firm—Mark J. Danielson; James W. Huffman

(57) ABSTRACT

A portion of an x86 microprocessor that supports MMX instructions provides a write tracking unit that tracks writes to a separately provided MMX register file, and updates a status register accordingly. A write control unit uses the contents of the status register to control transfers between the MMX register file and the FP register file, so as to only copy those registers that have changed. According to another aspect of the invention, the write control unit insures that architecturally required modifications to the exponent portion of FP registers corresponding to modified MMX registers are provided.

16 Claims, 4 Drawing Sheets

STATUS REGISTER ASSOCIATED WITH MMX REGISTER FILE FOR TRACKING WRITES

RELATED APPLICATION

This application is related to co-pending U.S. application Ser. No. 09/349,441 (IDT 1428), filed Jul. 9, 1999 and entitled, "Method and Apparatus for Tracking Coherency of Dual Floating Point and MMX Register Files," commonly owned by the assignee of the present application, the contents of which are incorporated herein by reference.

BACKGROUND OF THE INVENTION

1. Field of the Invention

The present invention relates to microprocessors, and more particularly to an x86 microprocessor architecture supporting MMX extensions in which coherency between separate floating point and MMX register files is provided.

2. Description of the Related Art

Since their introduction, x86 microprocessors have become nearly ubiquitous in computer applications. The original x86 instruction set included only scalar and integer instructions, executed by a scalar integer execution unit. Later, floating point instructions were added and eventually a floating point execution unit was included within the x86 microprocessor architecture for executing the floating point instructions. Recently, the x86 microprocessor architecture has been extended to include a new technology called MMX. MMX technology is a set of 57 new instructions added to the x86 architecture to speed up multimedia operations. For example, with one MMX instruction, 4 pairs of 16-bit numbers can be added, subtracted or multiplied at the same time. With the addition of MMX technology, an MMX execution unit has been incorporated within the x86 microprocessor architecture.

FIG. 1 illustrates a conventional x86 microprocessor 100 that includes MMX technology extensions. As shown, microprocessor 100 includes a bus interface 102, an instruction cache 104, an instruction fetch/translate unit 106, a microcode decode unit 108, a scalar integer unit 110, a floating point unit (FPU) 112, an MMX unit 114, and a data cache 116. Bus interface 102 handles reading and writing data and instructions between instruction cache 104, data cache 116 and external instruction and data memories available on an external processor bus. Cached x86 instructions are clocked out of instruction cache 104 by instruction fetch/translate unit 106, which then translates the fetched x86 instructions into processor microcode. The microcode is decoded by microcode decode unit 108 for execution by one of scalar integer unit 110, FPU 112, and MMX unit 114. Data operated upon by execution units 110, 112, 114 is locally stored in associated operand register files (not shown) and then is read from and written to memory via data cache 116.

In the x86 microprocessor architecture that includes MMX extensions, both floating point instructions and MMX instructions have operands that reference floating point registers in a floating point register file. If only a single FP register file is provided for both floating point and MMX instructions, however, to allow both FPU 112 and MMX unit 114 to have access to the FP register file, the FP register file would have to have four read ports and four write ports (two for the FPU, and two for the MMX unit). In addition, significant space on the processor would be required to connect both the FPU and the MMX unit to the one FP register file. Just adding the MMX unit connections would require 4×64, or 256 additional wires. Having this many connections provided to one register file is too costly in terms of chip space. For example, an additional 4×64 wires running between different execution units would require at least (4×64)×(1.2 microns (drawn dimension) in height)×(the length of the wires) in total chip area. One solution to this problem is to provide a second register file for MMX operations.

FIG. 2 shows a portion of an x86 processor having such separately provided FP and MMX register files. As shown, FPU 112 is connected to FP register file 220 having a plurality n of registers 224-1 to 224-n, and MMX unit 114 is connected to MMX register file 222 having a plurality n of registers 226-1 to 226-n. When FPU 112 receives a decoded FP instruction from microcode decode unit 108 that contains an operand that references one of registers 224-1 to 224-n, it executes the instruction with the contents of the referenced FP operand register. Likewise, when MMX unit 114 receives a decoded MMX instruction from microcode decode unit 108 that contains an operand that references one of registers 226-1 to 226-n, it executes the instruction with the contents of the referenced MMX operand register. If the executed FP or MMX instruction changes the contents of the referenced operand register, the FP or MMX unit writes the modified contents back to the register.

However, even though separate register files 220, 222 are provided, the x86 architecture requires that the two register files 220, 222 be treated as one. That is, the data in both of the register files 220, 222 must be coherent (i.e., the contents of FP register 224-1 must be coherent with the contents of MMX register 226-1, the contents of FP register 224-2 must be coherent with the contents of MMX register 226-2, and so on for each of the n registers in FP register file 220 and MMX register file 222). Accordingly, when the FP or MMX unit executes an instruction that modifies the contents of one of the registers in register files 220, 222, such modified contents must be reflected in the corresponding register in the other of register files 220, 222.

Tracking mechanisms could be used to cause a write to either register file to also cause a write to the other register file. Other mechanisms for maintaining coherency could require hundreds of processor cycles any time a context shift (from FP to MMX, or vice versa) occurs. More specifically, one could require that any time a coherency problem exists (i.e., when an executed FP or MMX instruction causes the contents of a register to be modified), the contents of all of the registers in a modified register file are copied to the other register file. This would effect the number of clock cycles required to maintain coherency. Co-pending application Ser. No. 09/349,441 (IDT 1428) solved the problem of efficiently tracking coherency between separate FP and MMX register files in an x86 processor so as to reduce to a minimum the number of times such copy operations are performed.

Still, copying the contents of all of the n registers in FP register file 220 to the corresponding n registers in MMX register file 222, or vice versa, any time such copy operations are required, is time consuming. In addition, although FP registers are 80 bits wide (64 bits for mantissa and 16 bits for exponent), MMX instructions deal only with the 64-bit mantissa portion. Providing a separate 8×80-bit MMX register file, for example, therefore incurs 8×16 bits of wasted space. But, if only an 8×64 bit MMX register file is separately provided, when copying contents of registers from MMX register file 222 to FP register file 220, the FP registers corresponding to MMX registers that have been changed are to have FFFF (hex) in the exponent, while those FP registers corresponding to MMX registers that have not been changed should not have the exponent portion altered. The setting of the exponent of changed FP registers is required by the Intel architecture. Accordingly, some tracking mechanism on the MMX side to determine which of the MMX registers were actually changed is necessary.

Accordingly, there remains a need in the art for reducing the time needed to maintain coherency between separate FP and MMX register files, while insuring that the architecturally required FFFF (hex) value is filled in the exponent portion of FP registers corresponding to modified MMX registers only. The present invention fulfills this need.

SUMMARY OF THE INVENTION

An object of the invention is to improve the time required to maintain coherency between the contents of separately provided MMX and FP register files.

Another object of the invention is to insure that the contents of FP registers corresponding to modified MMX registers, when moved to the FP register file, have the architecturally required FFFF (hex) value in the exponent portion.

Another object of the invention is to reduce the chip space required to separately provide MMX and FP register files.

The present invention fulfills these objects, among others, by providing a write control unit that monitors writes to the MMX register file and a status register that is updated accordingly. The write control unit uses the contents of the status register to control transfers of register contents between the MMX register file and the FP register file, so as to only copy those registers that have changed.

According to another aspect of the invention, the write control unit insures that architecturally required modifications to the exponent portion of FP registers corresponding to modified MMX registers are provided.

BRIEF DESCRIPTION OF THE DRAWINGS

These and other objects and advantages of the present invention will become apparent to those skilled in the art after considering the following detailed specification, together with the accompanying drawings wherein.

DETAILED DESCRIPTION OF THE PREFERRED EMBODIMENTS

Figure 1:
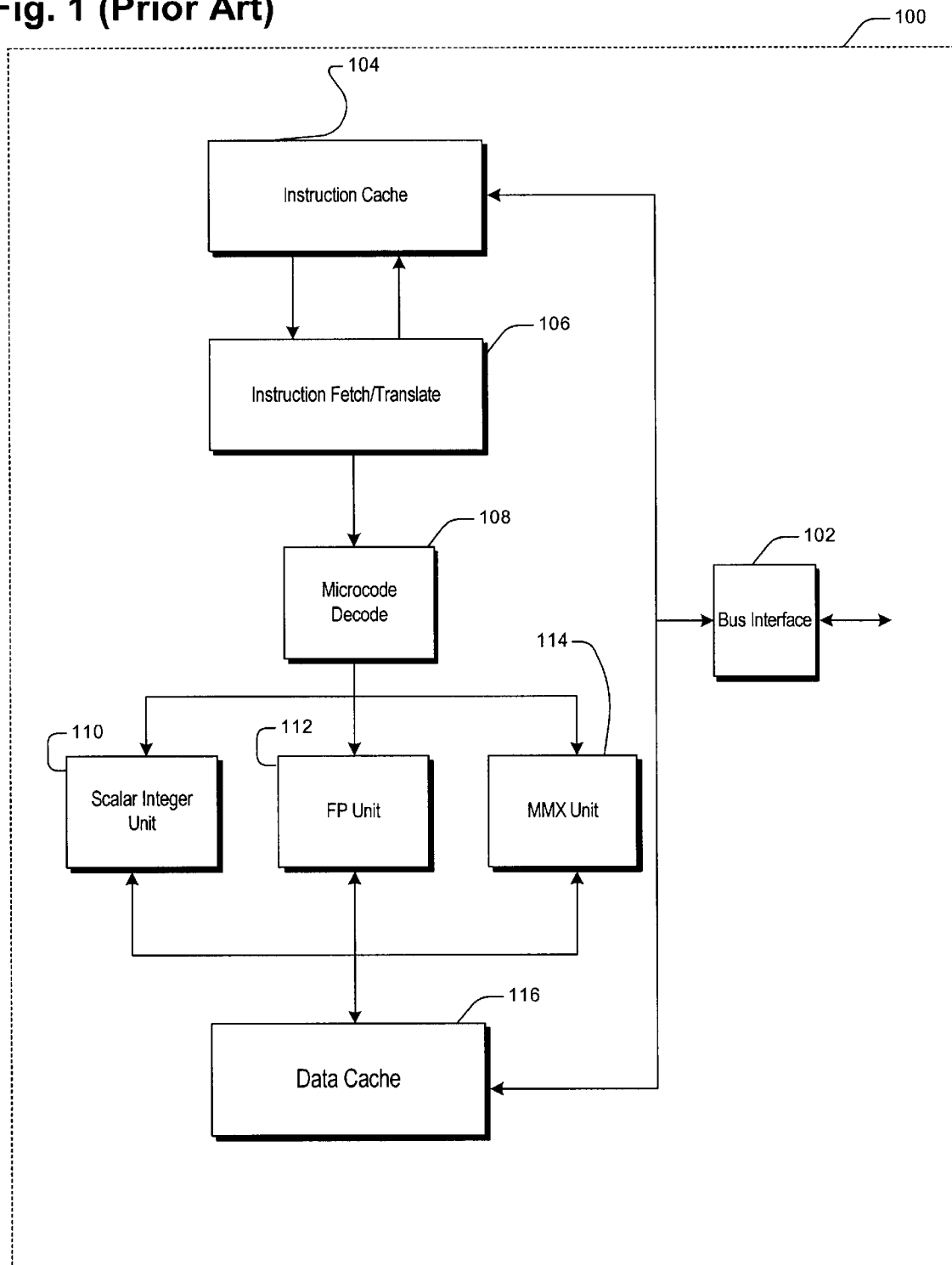
FIG. 1 is a block diagram of a conventional x86 microprocessor architecture including support for MMX extensions.
Figure 2:
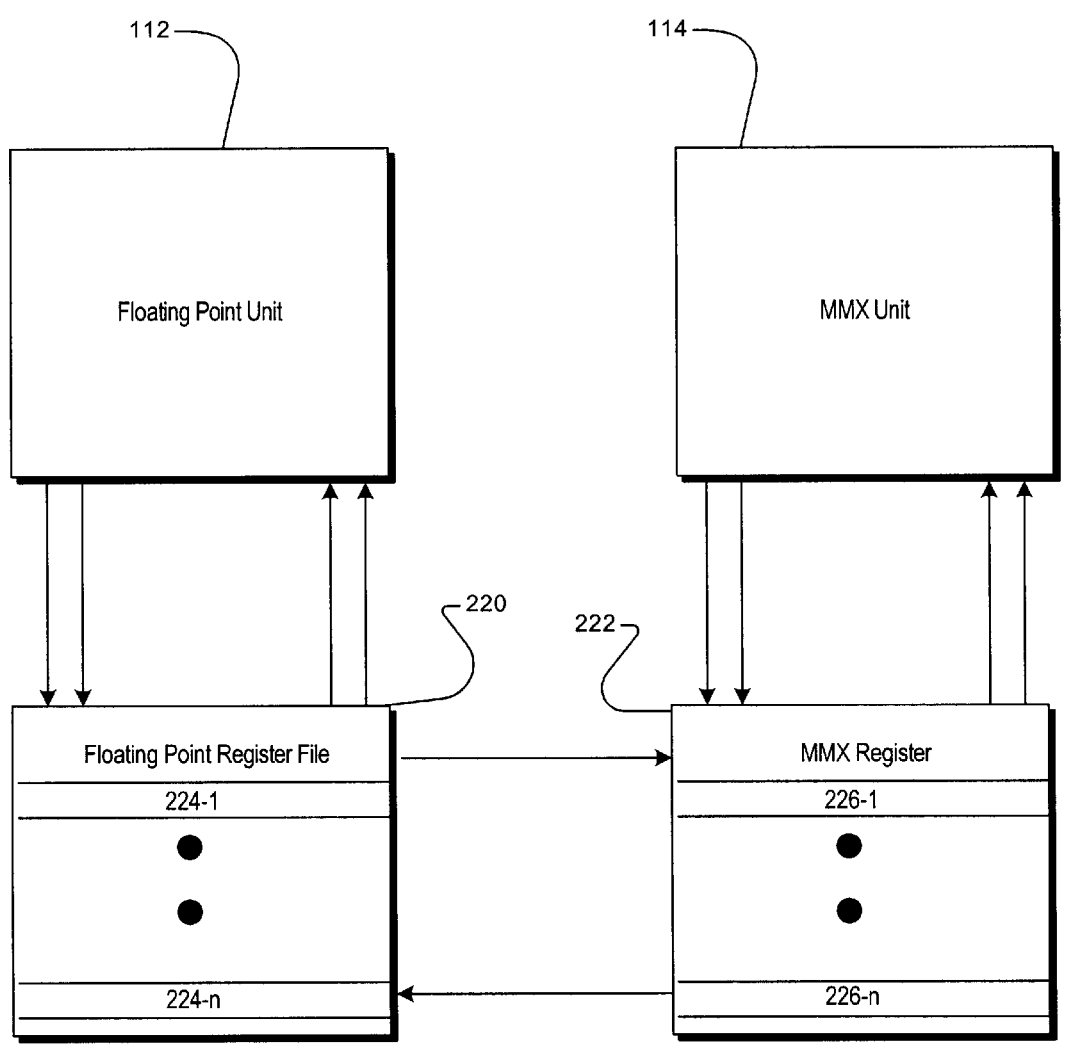
FIG. 2 is a block diagram of a portion of an x86 processor supporting MMX extensions with separately provided FP and MMX register files.
Figure 3:
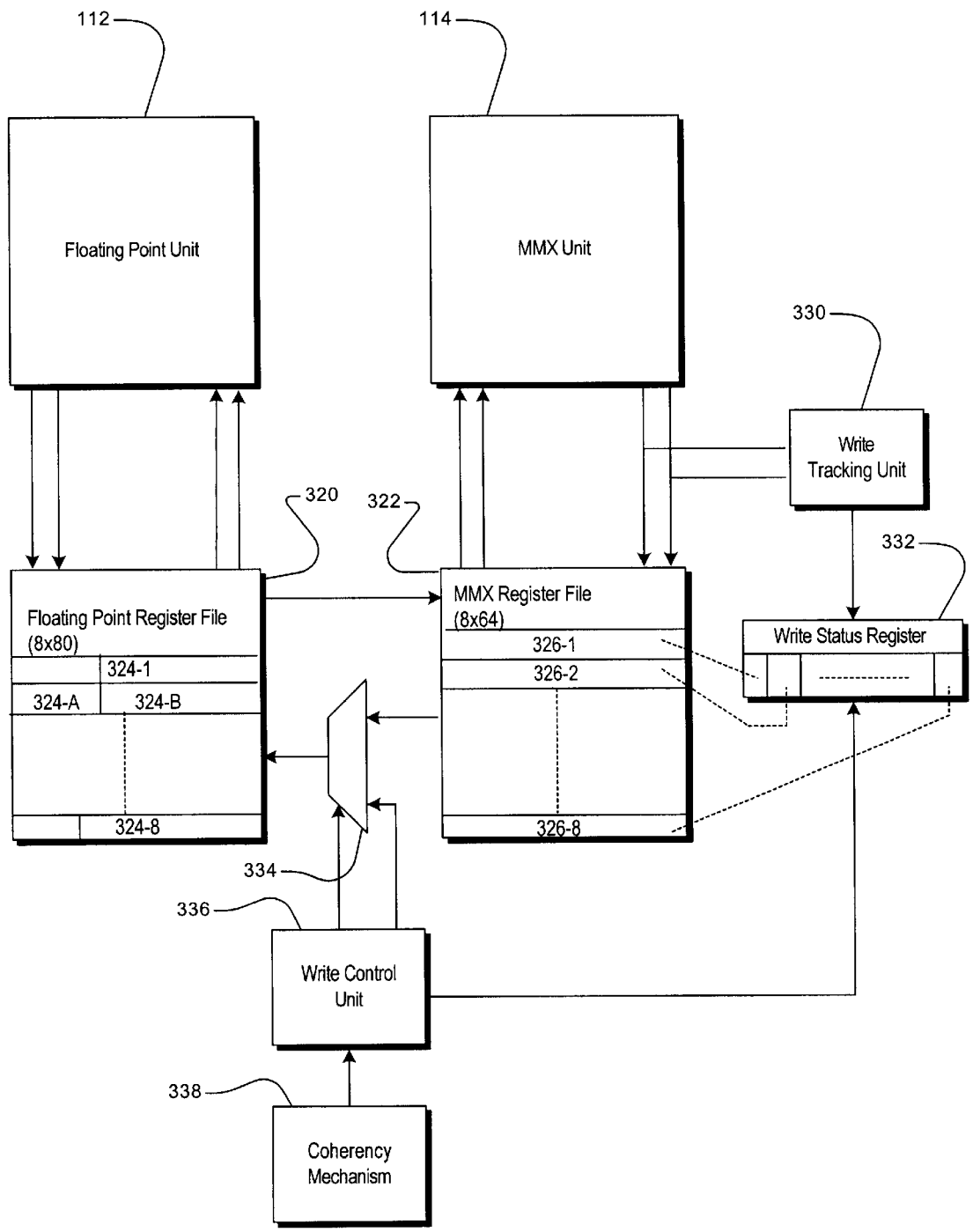
FIG. 3 is a block diagram of a portion of a x86 architecture supporting MMX extensions and maintaining coherency between separately provided FP and MMX register files according to the present invention.

As shown in FIG. 3, in a portion of a microprocessor according to the present invention, write status register 332 is provided in addition to MMX unit 114 and MMX register file 322. Preferably, status register 332 is configured to have one bit associated with each of the registers in MMX register file 322 (i.e. 8 bits in this example). MMX register file 322 contains, in this example, eight 64-bit MMX registers (i.e. 8×64). Write tracking unit 330 is coupled to the interconnections between MMX unit 114 and MMX register file 322, and is coupled to status register 332. When MMX unit 114 performs a write to a register within register file 322 (in response to a decoded instruction, for example), write tracking unit 330 senses the operation (for example, by sensing the address and write enable signals from MMX unit 114) and causes the bit in status register 332 corresponding to that modified register to be set. The circuitry for providing write tracking unit 330 can be implemented in many ways known to those skilled in the art after being taught about its functions by the present invention, and so the details thereof will be omitted here so as not to obscure the invention.

As further shown in FIG. 3, a write control unit 336 is coupled to status register 332, a coherency mechanism 338, and a mux 334. When coherency mechanism 338 (an exception handler, for example) commands write control unit 336 to initiate a transfer of the contents of registers within the MMX register file 322 to corresponding registers in the FP register file 320, it will permit the transfer for only those MMX registers whose contents were modified (i.e. written to). Write control unit 336 determines this by accessing the contents of status register 332 and inspecting the bit corresponding to each register 326-1 . . . 326-8 within MMX register file 332.

Write control unit 336 is also coupled to mux 334. When a transfer of the contents of registers from MMX register file 322 to FP register file 320 is commanded by the coherency mechanism, write control unit 336 causes the 64 bit contents of each MMX register 326 to be supplied to mux 334 for copying into the 64 bit mantissa portion 324-B of the corresponding FP register, and supplies to mux 334 a predetermined value of FFFF (hex) to be inserted in the 16 bit exponent portion 324-A of the corresponding FP register. If the MMX register was modified (indicated by a corresponding bit in status register 332), write control unit 336 enables the transfer of the register contents to the corresponding FP register. This insures that only modified registers will be copied, while providing the architecturally required FFFF (hex) in the exponent portion of the corresponding FP register so updated.

Figure 4:
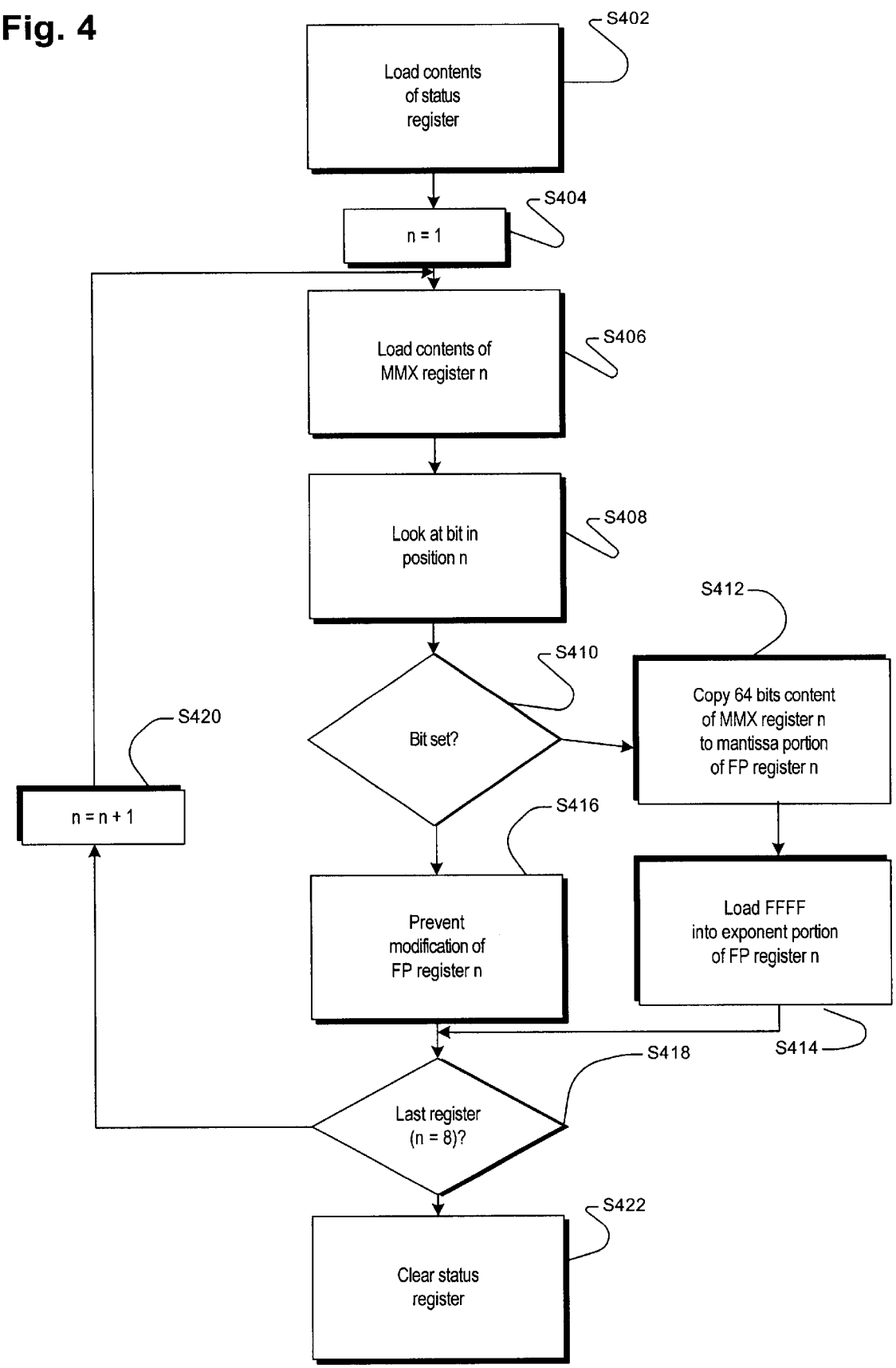
FIG. 4 is a flowchart illustrating an operation for transferring the contents of modified registers to the other register file using a status register according to the present invention.

FIG. 4 further illustrates the operation of selectively copying register file contents in accordance with the present invention. When initiated by coherency mechanism 338, write control unit 336 loads the contents of status register 332 (step S402). Coherency mechanism 338 attempts to copy the contents of all the registers within MMX register file 322 to corresponding registers in FP register file 320. Accordingly, it loops through copy commands for each of the registers, beginning with the first (n=1) (step S404). Receiving such a command, write control unit 336 causes the contents of MMX register n to be supplied to inputs of mux 334 (step S406). Write control unit 336 enables the supplied contents of MMX register n to be output in accordance with the corresponding bit n of the status register (inspected in step S408). If the bit is set (determined in step S410, meaning that the corresponding register was modified), write control unit 336 causes the 64 bit contents of the modified MMX register to be copied from mux 334 into the 64 bit mantissa portion of the corresponding FP register n within FP register file 320 (step S412). At the same time, write control unit 336 supplies a value of FFFF (hex) to mux 334 which causes the 16 bit exponent portion of the corresponding FP register to be filled with FFFF (hex) (step S414). If the bit inspected in step S408 is not set, write control unit 336 prevents the corresponding FP register n from being modified (by controlling mux 334 so as not to enable the supplied inputs to be output). Following the above processing (steps S410–S416), processing advances to step S418 where coherency mechanism 338 determines whether all of the registers in MMX register file 322 have been copied (n=8 in this example). If not, the next register is selected (step S420) and processing returns to step S406. If all registers have been updated, write control unit 336 clears the status register (step S422) and processing ends.

Selective updating of registers between the FP register file and the MMX register file provides a considerable time savings, whether coherency is maintained for every MMX instruction, or whether coherency is maintained only as required, as described in co-pending application Ser. No. 09/349,441 (IDT 1428). And, tracking of which MMX registers are actually modified allows a MMX register file that is 8×64, rather than 8×80, while still properly updating the exponent portion of FP registers corresponding to modified MMX registers. Accordingly, the present invention reduces the time required to update the FP register file in accordance with the MMX register file, especially when only a few registers in the MMX register file have been changed. And, it allows the architecturally required FFFF (hex) to be provided in the exponent portion of floating point registers that have been modified by MMX instructions.

In this example of the invention as described above, the selective updating of modified registers is performed in accordance with tracking writes to MMX registers only, whereas no such tracking is performed for FP registers. Accordingly, in this example, the contents of all FP registers (whether modified are not) are copied to corresponding MMX registers when coherency of the MMX register file with the FP register file is required. However, it should be understood that the principles of the invention can be extended to tracking writes to FP registers as well. In such an alternative embodiment, only the contents of modified FP registers would be used to update the MMX register file when coherency of the MMX register file with the FP register file is required.

Accordingly, although the present invention has been described in detail hereinabove with reference to the preferred embodiments thereof, those skilled in the art will appreciate that various substitutions and modifications can be made to the examples provided while remaining within the spirit and scope of the invention as defined in the appended claims.

I claim:

1. A portion of a microprocessor having a floating point unit for executing floating point instructions, a MMX unit for executing MMX instructions, a plurality of floating point registers for storing information referenced by said floating point instructions, and a plurality of MMX registers for storing information referenced by said MMX instructions, each one of said MMX registers corresponding to one of said floating point registers, said portion comprising:

a write tracking unit that detects when contents of certain of said MMX registers have been modified;

a status register coupled to said write tracking unit that stores information indicating said certain MMX registers that have been modified; and a write control unit coupled to said status register for receiving said information, said write control unit causing said modified contents of said certain MMX registers to be copied to said corresponding floating point registers.

2. A portion of a microprocessor as defined in claim 1, wherein said write control unit causes said modified contents of said certain MMX registers to be copied in response to a command from a coherency mechanism indicating that coherency between said floating point registers and said MMX registers is required.

3. A portion of a microprocessor as defined in claim 2, wherein said write control unit further prevents contents of certain other of said plurality of floating point registers not corresponding to said certain MMX registers from being modified in response to said command from said coherency mechanism.

4. A portion of a microprocessor as defined in claim 1, wherein said write control unit further prevents contents of certain other of said plurality of floating point registers not corresponding to said certain MMX registers from being modified.

5. A portion of a microprocessor as defined in claim 1, wherein said write control unit causes said modified contents of said certain MMX registers to be copied to a mantissa portion of each of said corresponding floating point registers, said write control unit further causing a predetermined value to be copied to an exponent portion of each of said corresponding floating point registers.

6. A portion of a microprocessor as defined in claim 5, wherein said floating point registers each have a bit width corresponding to a bit width of said mantissa portion.

7. A portion of a microprocessor as defined in claim 1, further comprising:

a mux having a first input coupled to said MMX registers for receiving contents of said MMX registers, an output coupled to said floating point registers for copying said contents to said floating point registers, and a control coupled to said write control unit, said write control unit causing said modified contents of said certain MMX registers to be copied to said floating point registers by enabling said control.

8. A portion of a microprocessor as defined in claim 7, wherein said mux further includes a second input coupled to said write control unit for receiving a predetermined value, said output being adapted for copying said modified contents of said certain MMX registers to a mantissa portion of each of said floating point registers and for copying said predetermined value to an exponent portion of each of said floating point registers.

9. A method for maintaining coherency between a floating point register file and a MMX register file in a microprocessor having a floating point unit for executing floating point instructions, and a MMX unit for executing MMX instructions, said floating point register file comprising a plurality of floating point registers for storing information referenced by said floating point instructions, and said MMX register file comprising a plurality of MMX registers for storing information referenced by said MMX instructions, each one of said MMX registers corresponding to one of said floating point registers, said method comprising:

detecting when contents of certain of said MMX registers have been modified;

storing information indicating said certain MMX registers that have been modified; and causing said modified contents of said certain MMX registers to be copied to said corresponding floating point registers.

10. A method as defined in claim 9, further comprising:

receiving a command from a coherency mechanism indicating that coherency between said floating point registers and said MMX registers is required, said step of causing said modified contents of said certain MMX registers to be copied being performed in response to said command.

11. A method as defined in claim 10, further comprising:

preventing contents of certain other of said plurality of floating point registers not corresponding to said certain MMX registers from being modified in response to said command from said coherency mechanism.

12. A method as defined in claim 9, further comprising:

preventing contents of certain other of said plurality of floating point registers not corresponding to said certain MMX registers from being modified.

13. A method as defined in claim 9, further comprising:

causing said modified contents of said certain MMX registers to be copied to a mantissa portion of each of said corresponding floating point registers; and causing a predetermined value to be copied to an exponent portion of each of said corresponding floating point registers.

14. A portion of a microprocessor having a floating point unit for executing floating point instructions, a MMX unit for executing MMX instructions, a plurality of floating point registers for storing information referenced by said floating point instructions, and a plurality of MMX registers for storing information referenced by said MMX instructions, each one of said MMX registers corresponding to one of said floating point registers, said portion comprising:

a write tracking unit that detects when contents of one of said MMX registers have been modified; and a write control unit that receives information indicating said one MMX register that has been modified and causes said modified contents of said one MMX register to be copied to a mantissa portion of said corresponding one of said floating point registers, said write control unit further causing a predetermined value to be copied to an exponent portion of said corresponding one of said floating point registers.

15. A portion of a microprocessor as defined in claim 14, wherein said MMX registers each have a bit width corresponding to a bit width of said mantissa portion of said floating point registers.

16. A method for maintaining coherency between a floating point register file and a MMX register file in a microprocessor having a floating point unit for executing floating point instructions and a MMX unit for executing MMX instructions, said floating point register file comprising a plurality of floating point registers for storing information referenced by said floating point instructions, and said MMX register file comprising a plurality of MMX registers for storing information referenced by said MMX instructions, each one of said MMX registers corresponding to one of said floating point registers, said method comprising:

detecting when contents of one of said MMX registers have been modified;

indicating said one MMx register that has been modified;

causing, in accordance with said indication, said modified contents of said one MMX register to be copied to a mantissa portion of said corresponding one of said floating point registers; and further causing, in accordance with said indication, a predetermined value to be copied to an exponent portion of said corresponding one of said floating point registers.

* * * * *